(12) United States Patent
Folkes (10) Patent No.: US 7,903,665 B2
(45) Date of Patent: Mar. 8, 2011

(54) SYSTEM AND METHOD FOR SYNCHRONIZING PACKET FORWARDING INFORMATION

(75) Inventor: Ronald P. Folkes, Addison, TX (US)

(73) Assignee: Fujitsu Limited, Kawasaki (JP)

( * ) Notice: Subject to any disclaimer, the term of this patent is extended or adjusted under 35 U.S.C. 154(b) by 489 days.

(21) Appl. No.: 11/844,771

(22) Filed: Aug. 24, 2007

(65) Prior Publication Data

US 2009/0052445 A1  Feb. 26, 2009

(51) Int. Cl.
*H04B 7/212* (2006.01)
(52) U.S. Cl. .................................. 370/395.31
(58) Field of Classification Search .................. 370/324, 370/350, 389, 395.31, 503, 507, 509–514; 709/238, 242
See application file for complete search history.

(56) References Cited

U.S. PATENT DOCUMENTS

2003/0009584 A1\* 1/2003 Basso et al. .................. 709/238

\* cited by examiner

*Primary Examiner* — Seema S Rao
*Assistant Examiner* — Leon Andrews
(74) *Attorney, Agent, or Firm* — Baker Botts L.L.P.

(57) ABSTRACT

A system for synchronizing packet forwarding information includes a control processor configured to implement a control plane to generate first forwarding information and transfer the first forwarding information to an active forwarding table of a network processor. The system also includes a network processor configured to implement a forwarding plane to receive packets and use the first forwarding information in the active forwarding table to forward the received packets to one or more network devices. After the control plane is restarted, the control processor is further configured to use the restarted control plane to generate second forwarding information and incrementally update the first forwarding information in the active forwarding table with the second forwarding information while the network processor's forwarding plane continues to forward traffic.

12 Claims, 9 Drawing Sheets

FIG. 8

SYSTEM AND METHOD FOR SYNCHRONIZING PACKET FORWARDING INFORMATION

TECHNICAL FIELD

The present invention relates generally to communication systems and, more particularly, to a system and method for synchronizing packet forwarding information.

BACKGROUND

Highly-available packet forwarding systems in information networks use a control plane implemented by a control processor to build a forwarding table and a forwarding plane implemented by a network processor to forward received packets based on the forwarding table information. When the control processor must be restarted (e.g., after a failure or upgrade of the control plane), the control processor (but not the network processor) may lose the forwarding table information. After restart or upgrade, the control processor may implement a control plane to build a new forwarding table, which may be different than the old forwarding table being used by the network processor's forwarding plane to forward packets. A challenge arises concerning how to synchronize the old forwarding table and the new forwarding table to forward packets effectively.

SUMMARY

In accordance with the teachings of the present invention, a system and method for synchronizing packet forwarding information is provided. In a particular embodiment, the system includes a control processor configured to implement a control plane to generate first forwarding information and transfer the first forwarding information to an active forwarding table of a network processor. The system also includes a network processor configured to implement a forwarding plane to receive packets and use the first forwarding information in the active forwarding table to forward the received packets to one or more network devices. After the control plane is restarted, the control processor is further configured to use the restarted control plane to generate second forwarding information and incrementally update the first forwarding information in the active forwarding table with the second forwarding information while the network processor's forwarding plane continues to forward traffic.

Technical advantages of one or more embodiments of the present invention may include providing a system that is able to forward packets while the old forwarding table and the new forwarding table are synchronized. This is advantageous over disabling packet forwarding while the old forwarding table and the new forwarding table are synchronized, which can cause outages lasting several seconds to several minutes. Any outages in packet forwarding are highly inconvenient for network users.

Another technical advantage of one or more embodiments of the present invention may include not requiring that a relatively large amount of memory exist in the network processor to synchronize the old forwarding table and the new forwarding table. Other solutions store both the old forwarding table and the new forwarding table in the network processor and then perform a switchover from the old forwarding table to the new forwarding table. Storing both tables in the network processor requires a relatively large amount of memory. Also, these solutions require that the network processor be able to perform the switchover, which may not be possible.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
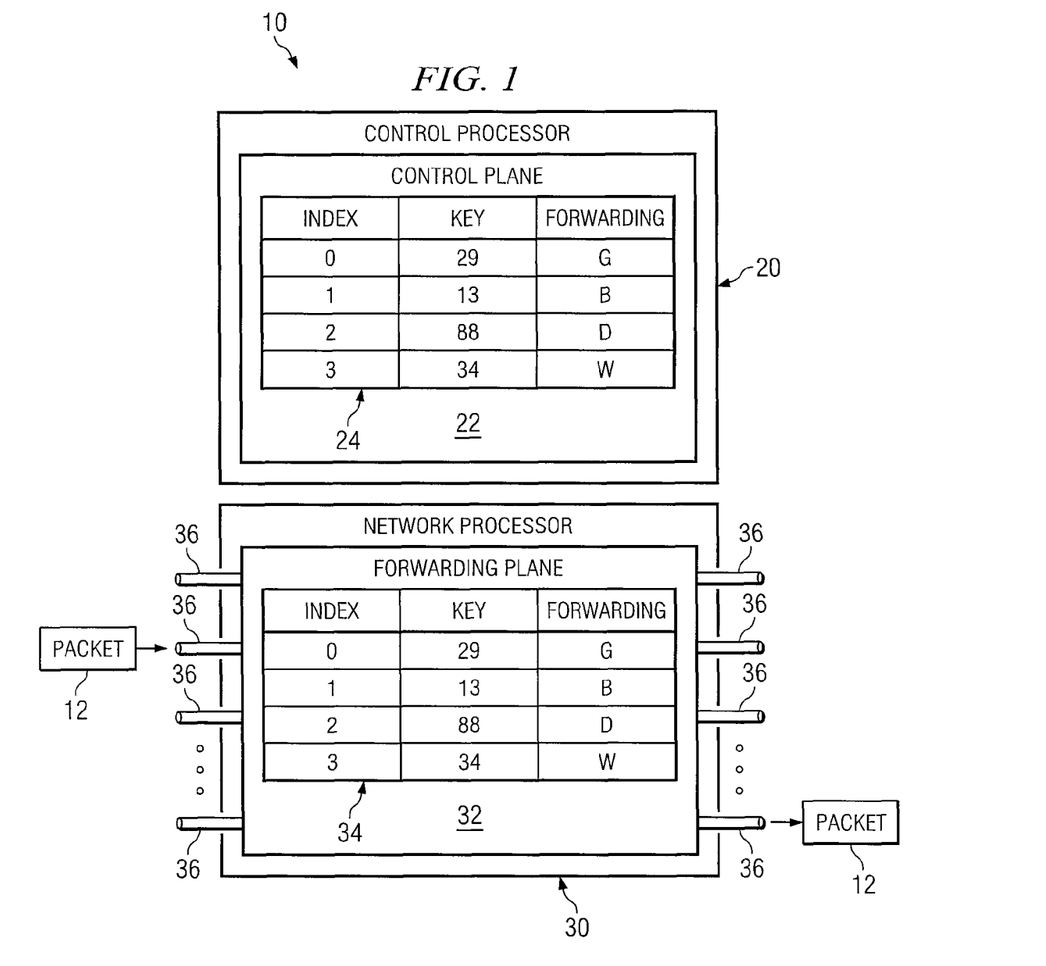
FIG. 1 is a diagram illustrating an example packet forwarding system during regular operation according to a particular embodiment of the invention.

FIG. 1 is a diagram illustrating an example packet forwarding system 10 during regular operation according to a particular embodiment of the invention. Packet forwarding system 10 resides in any suitable network and is operable to receive packets 12 from one or more network devices and forward the received packets 12 to one or more network devices based on forwarding information created and stored in packet forwarding system 10. In particular embodiments, the components and functionality of packet forwarding system 10 may reside on and be performed by one networking device, such as, for example, a single switch or router. In particular embodiments, these components may comprise physically separate hardware components that may be connected in any suitable manner such as, for example, using an internal communication path such as a system bus. In alternative embodiments, the components or functionality of packet forwarding system 10 may be distributed among multiple networking devices and connected in any suitable manner. It should be noted that, as used herein, a packet may refer to any suitable formatted block of information that includes, for example, control information and application-specific data, and that is being forwarded through a data network. The control information may be used by the data network to forward the packet along a path from source to destination.

In particular embodiments, packet forwarding system 10 may be an example of a highly-available packet forwarding system. A highly available packet forwarding system may be employed by any suitable packet network, such as, for example an internet network. A network comprised of highly available packet forwarding systems may provide, for example, better service uptime to end users.

Packet forwarding system 10 comprises a control processor 20 and a network processor 30. Control processor 20 comprises any suitable processor operable to implement control plane 22, and network processor 30 comprises any suitable processor operable to implement forwarding plane 32. It should be noted however that in alternative embodiments, control plane 22 and forwarding plane 32 may be implemented by different network devices, and each may be implemented by more than one network device.

Control plane 22 comprises any suitable function or set of functions, such as, for example, a software program, operable to build a forwarding table 24 for forwarding packets. Control plane 22 may build forwarding table 24 in any suitable manner, including, for example, based on one or more updates to the status in network configuration and/or protocol information and/or any other suitable information. Control plane 22 is further operable to transfer the information in forwarding table 24 to forwarding plane 32 by, for example, writing corresponding entries to forwarding table 34, discussed below, in any suitable manner. Control plane 22 is also operable to read entries from forwarding table 34 in any suitable manner. As discussed further below, forwarding table 34 is used by forwarding plane 32 to perform packet processing and forwarding.

Example forwarding table 24 comprises any suitable table or other organization of data for storing information about how received packets are to be processed and forwarded by packet forwarding system 10. In the illustrated embodiment, forwarding table 24 comprises an index column, a key column, and a forwarding column. Each index value in the index column identifies a specific row of the table. Each key in the key column corresponds to information stored in one or more fields of a received packet 12 that identifies that packet 12. The identifying information (and thus, a key) may be shared by a plurality of packets 12 or be unique to a particular packet 12. For each key, forwarding table 24 comprises instructions for packet processing and forwarding in the forwarding column. These instructions are illustrated as letters in FIG. 1, which are assumed to correspond to a set of actions, but may take any other suitable form, such as, for example, explicit descriptions for the forwarding behavior. In alternative embodiments, example forwarding table 24 may comprise alternative or additional information (e.g., columns, rows, identifiers, and instructions) for suitably forwarding packets 12.

Network processor 30 is operable to receive packets 12 at one or more ports 36. Forwarding plane 32, implemented by network processor 30, comprises any suitable function or set of functions, such as, for example, a software program, operable to process the received packets 12 and forward them from one or more ports 36 based on the forwarding information in forwarding table 34. As discussed above, control plane 22 writes entries in example forwarding table 34 to correspond to the entries in forwarding table 24.

Like forwarding table 24, forwarding table 34 comprises any suitable table or other organization of data for storing information about how packets are to be processed and forwarded by forwarding plane 32. In the illustrated embodiment, forwarding table 34 comprises an index column, a key column, and a forwarding column. Each entry is separately accessible to for example, control plane 22 and forwarding plane 32, using an index value in the index column. Each index value in the index column identifies a specific row of the table. As noted above, each key in the key column corresponds to information stored in one or more fields of a received packet 12 that identifies that packet 12. The identifying information (and thus, a key) may be shared by a plurality of packets 12 or be unique to a particular packet 12. For each key, forwarding table 34 comprises instructions for packet processing and forwarding in the forwarding column. These instructions are illustrated as letters in FIG. 1, which are assumed to correspond to a set of actions, but may take any other suitable form, such as, for example, explicit descriptions for the forwarding behavior. Forwarding plane 32 processes and forwards packets 12 from particular ports 36 based on these instructions. In alternative embodiments, example forwarding table 34 may comprise alternative or additional information (e.g., columns, rows, identifiers, and instructions) for suitably forwarding packets 12. As can be observed, the information in forwarding table 34 directly corresponds to the information in forwarding table 24.

In operation, control processor 20 of packet forwarding system 10 implements control plane 22. Control plane 22 builds forwarding table 24, based on, for example, network configuration and/or protocol information and/or any other suitable information. Control plane 22 transfers the information in forwarding table 24 to forwarding plane 32 by writing corresponding entries to forwarding table 34 of forwarding plane 32. In the initial state of the system, when forwarding plane 32 does not have any forwarding table, control plane 22 may copy the entire table 24 into forwarding plane 32 in particular embodiments. In alternative embodiments, control plane 22 may write one or more entries at a time into forwarding plane 32.

Network processor 30 of packet forwarding system 10 receives packets 12 at one or more ports 36. Forwarding plane 32 of network processor 30 processes a received packet 12 by identifying the key that corresponds to the information in one or more of the packet's fields. Forwarding plane 32 uses the key to identify, in forwarding table 34, the corresponding processing and forwarding instructions. Forwarding plane 32 then uses the processing and forwarding instructions to forward the received packet 12 from a particular port 36. In this manner, packet forwarding system 10 builds a suitable forwarding table 24, copies the information in forwarding table 24 to forwarding table 34, receives packets 12, and uses the forwarding information in forwarding table 34 to process and forward the received packets 12.

Figure 2:
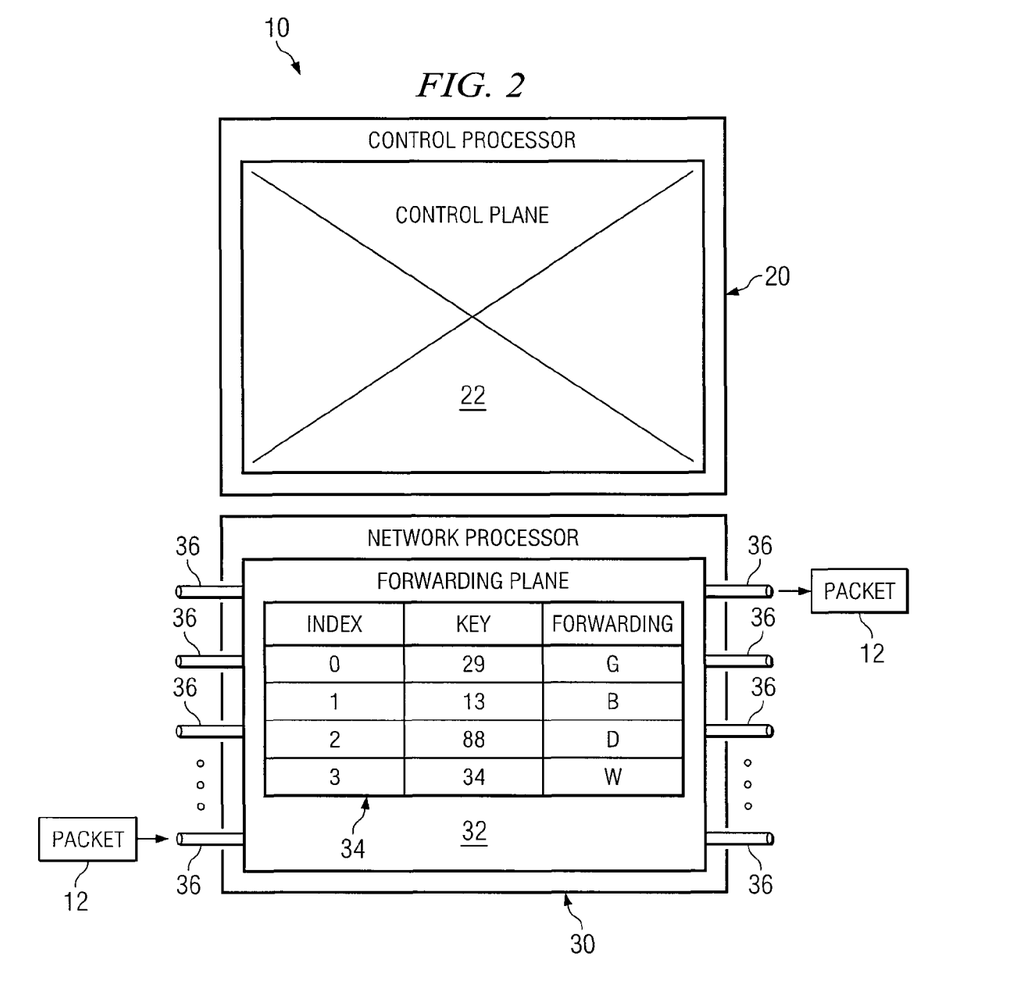
FIG. 2 is a diagram illustrating the example packet forwarding system of FIG. 1 after a control plane failure or upgrade according to a particular embodiment of the invention.

FIG. 2 is a diagram illustrating the example packet forwarding system 10 of FIG. 1 after a control plane failure or upgrade according to a particular embodiment of the invention. From time to time, control plane 22 may fail or be upgraded (e.g., to add bug fixes or new capabilities). In these circumstances, the state information in forwarding table 24 may be lost. Since control plane 22 and forwarding plane 32 of packet forwarding system 10 are separate and forwarding plane 32 has access to forwarding table 34, forwarding plane 32 is operable to continue to forward packets 12 uninterrupted based on information in forwarding table 34, as discussed above, even if the information in forwarding table 24 is lost after a control plane failure or upgrade. Indeed, the ability to continue to forward packets during control plane failure or upgrade may be an important feature for some highly-available packet forwarding systems.

Control processor 20 may be restarted to recover (or replace) control plane 22 after a failure (or an upgrade). Since the state information in forwarding table 24 has been lost, control plane 22 is operable to regenerate this information based on network configuration and/or protocol information and/or any other suitable information. In particular circumstances, the information in the regenerated forwarding table in control plane 22 may be different than the lost forwarding table information, a copy of which is being used by forwarding plane 32 to forward packets. This difference in forwarding table information may occur, for example, if the network configuration and/or protocol information and/or other suitable information used to build the forwarding table changes during the control plane failure or upgrade. Another reason the regenerated forwarding table information may differ from the lost forwarding table information is that the order of the entries may change. For example, the lost forwarding table information may have been subject to adding, modifying and deleting entries over a period of time. The regenerated forwarding table information may be created simply by adding the valid entries in order. Failing to synchronize the information in the regenerated forwarding table in control plane 22 and the information in active forwarding table 34 in forwarding plane 32 may lead to improper packet forwarding.

One solution to synchronize the information in the two tables is to disable packet forwarding while synchronizing the forwarding table in the forwarding plane. However, this outage in packet forwarding can last several seconds to several minutes. Any outage in packet forwarding is highly inconvenient for network users.

Another solution is to store both the old forwarding table and the regenerated forwarding table in the forwarding plane and perform a switchover from the old forwarding table to the new forwarding table. However, storing both tables in the forwarding plane requires a relatively large amount of memory in the forwarding plane. Also, this solution requires that the forwarding plane be able to perform the switchover, which may not be possible.

Figure 3:
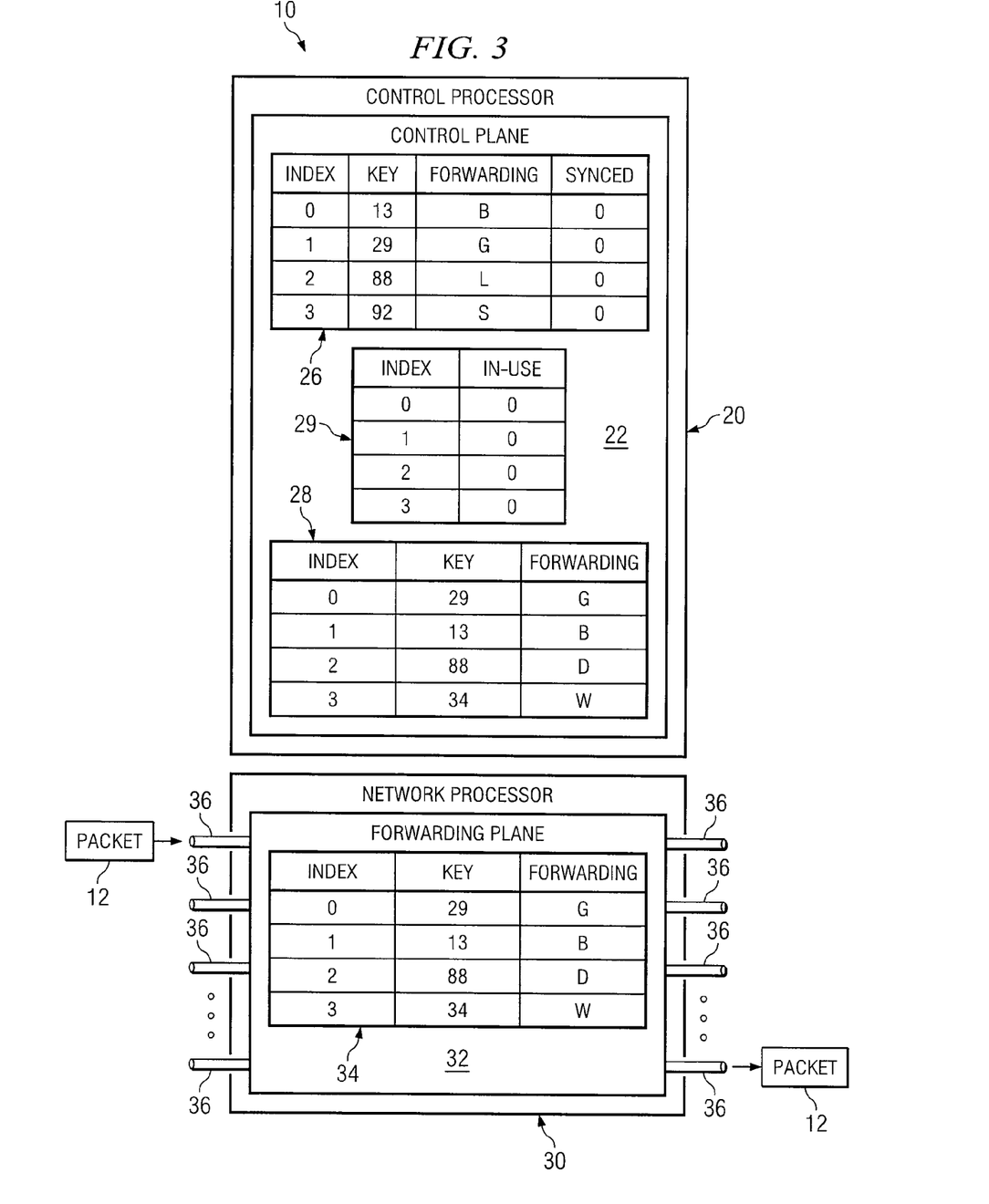
FIG. 3 is a diagram illustrating the example packet forwarding system of FIG. 1 after control plane recovery according to a particular embodiment of the invention.

FIG. 3 is a diagram illustrating the example packet forwarding system 10 of FIG. 1 after control plane recovery according to a particular embodiment of the invention. After control processor 20 recovers (or replaces) control plane 22 after a failure (or an upgrade), control plane 22 is operable to regenerate forwarding table information in forwarding table 26, referred to herein as the "new" or "regenerated" forwarding table. In particular embodiments, control plane 22 may generate table 26 in any suitable manner, such as, for example, based on network configuration and/or protocol information and/or any other suitable information. As discussed above, the entries in regenerated forwarding table 26 may sometimes be different than the entries in active forwarding table 34. Thus, synchronization is required to effectively forward packets.

Analogously to forwarding table 24 of FIG. 1, example forwarding table 26 comprises any suitable table or other suitable organization of data for storing information about how packets are to be processed and forwarded by packet forwarding system 10. In the illustrated embodiment, forwarding table 26 comprises an index column, a key column, a forwarding column, and a synchronized, or "synced," column. Each index value in the index column identifies a specific row of the table. Each key in the key column corresponds to information stored in one or more fields of a received packet that identifies that packet. The identifying information (and thus, a key) may be shared by a plurality of packets 12 or be unique to a particular packet 12. For each key, forwarding table 26 comprises instructions for packet processing and forwarding in the forwarding column. These instructions are illustrated as letters in FIG. 3 but may take on any other suitable form. For each entry, forwarding table 26 also includes a "0" or "1" in the synced column to indicate whether the entry has been synchronized with forwarding table 34. If "0," the entry has not been synchronized. If "1," the entry has been synchronized. Before synchronization begins, control processor 20 initially sets all entries in the synced column to "0." After synchronization, all entries include a "1" in the synced column. In alternative embodiments, example forwarding table 26 may comprise alternative or additional information (e.g., columns, rows, identifiers, instructions, and statuses) for suitably forwarding packets 12.

In addition to regenerating information in forwarding table 26 of control plane 22, control processor 20 is also operable to read the information in forwarding table 34 of network processor 30 and generate (and store) an internal copy of this information in table 28 of control plane 22. Table 28, referred to herein as the "forwarding table internal copy," comprises the same information as that in table 34 and thus will not be described again in detail. Table 28 may be accessed by control plane 22 using the same key search as used by control plane 22 or forwarding plane 32 to access entries in forwarding table 34. It should be noted that, in particular embodiments, memory in control processor 20 may be less expensive than memory in network processor 30. Thus, generating additional tables in control processor 20 to synchronize forwarding table information may be more cost-effective than generating additional tables in network processor for that purpose.

Control processor 20 is also operable to generate a table 29 to store the in-use status of each entry in forwarding table 34 in network processor 30, thereby allowing entries to be added to and removed from forwarding table 34 during and after the synchronization process, as discussed below. Table 29, referred to herein as the "in-use table," comprises an index column and an in-use column. Each index value in the index column corresponds to a particular index value in forwarding table 34. For each index value, table 29 includes a "0" or "1" in the in-use column to indicate whether the corresponding entry in forwarding table 34 is active. If "0," the entry in forwarding table 34 is inactive. If "1," the entry is active. Before synchronization, control processor 20 initially sets all entries in the in-use column to "0." After synchronization, one or more (including all) entries in the in-use column may include a "1." In alternative embodiments, example in-use table 29 may comprise alternative or additional information.

In particular embodiments, to synchronize the information in new forwarding table 26 and the information in active forwarding table 34, control processor 20 is operable to, for each entry in new forwarding table 26, determine, using a key search, whether an entry with the same key exists in forwarding table internal copy 28, maintain or modify existing entries with the same key in active forwarding table 34, and update these entries as "in-use" in in-use table 29. Thereafter, control processor 20 is operable to determine the entries in in-use table 29 that are not in-use and remove the forwarding information in these entries from active forwarding table 34 (or otherwise cause these entries in table 34 to be ignored by network processor 30). Control processor 20 is also operable to determine the entries in table 26 that comprise keys that do not match keys in forwarding table internal copy 28 and write the information in these entries to entries in active forwarding table 34 that are not in-use (as indicated in table 29). After writing this information in table 34, control processor 20 may change the in-use status in table 29 for these entries. This example synchronization process is discussed in more detail below.

As discussed, to begin the synchronization process in particular embodiments, control processor 20 is operable to, for each entry in new forwarding table 26, determine, using a key search, whether an entry with the same key exists in forwarding table internal copy 28. If control processor 20 determines that an entry with the same key exists in forwarding table internal copy 28, control processor 20 is operable to determine whether the processing and forwarding information is the same in tables 26 and 28 for that key. If the processing and forwarding information is the same in the two tables for that key, control processor 20 is operable to change the in-use status of the entry in in-use table 29 that corresponds to the index value for the particular key in forwarding table internal copy 28. Thus, the in-use status in the corresponding entry in in-use table 29 changes from "0" to "1" to indicate that the corresponding entry in active forwarding table 34 is active. Control processor 20 is also operable to change the synced status of the entry in table 26 for the particular key from "0" to "1" to indicate that the entry is synchronized.

Figure 4:
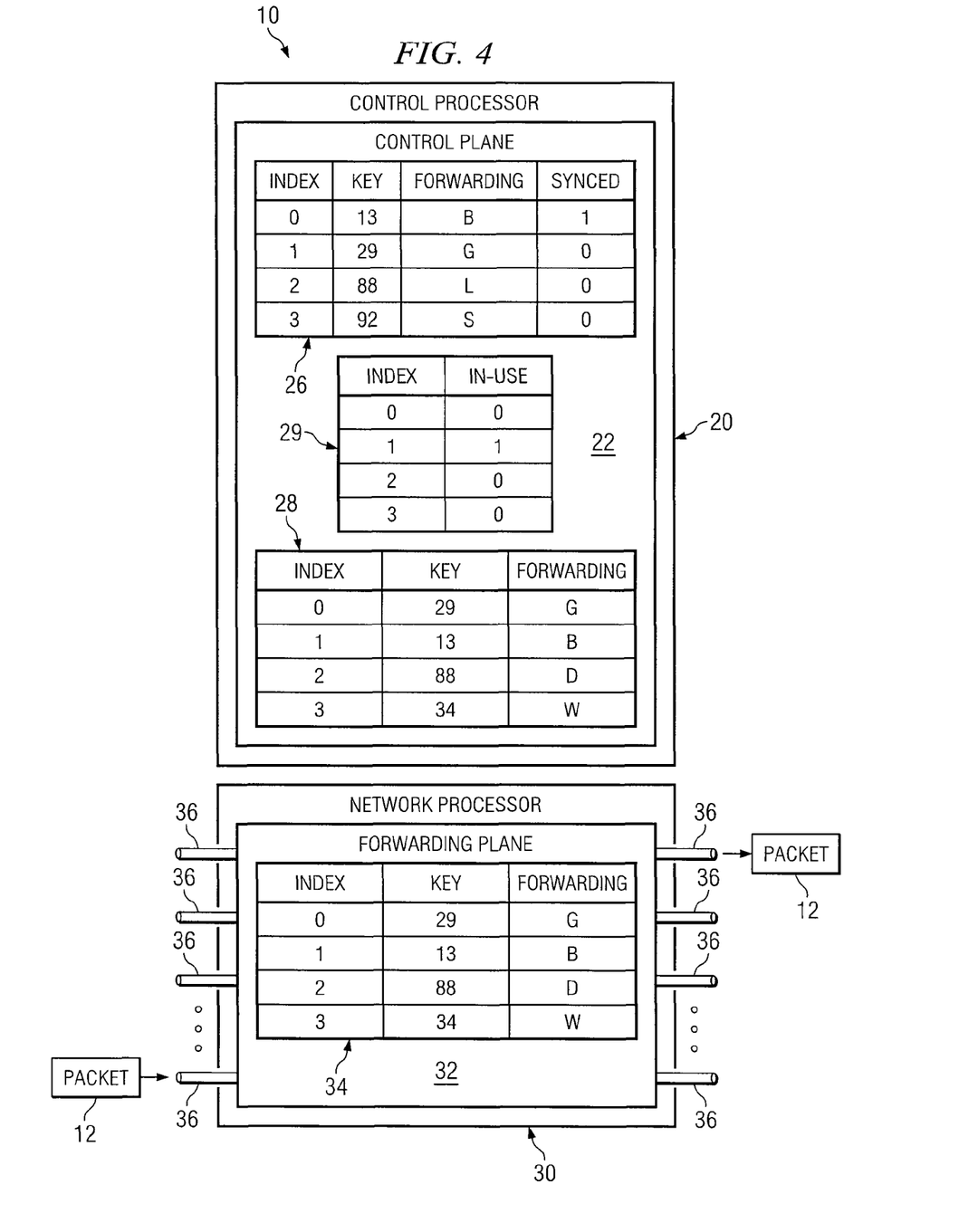
FIGS. 4, 5, 6, and 7 are diagrams illustrating the example packet forwarding system of FIG. 3 after partial synchronization of the new forwarding table and the active forwarding table according to a particular embodiment of the invention.

FIGS. 4, 5, 6, and 7 are diagrams illustrating the example packet forwarding system 10 of FIG. 3 after partial synchronization of the new forwarding table 26 and the active forwarding table 34 according to a particular embodiment of the invention. As illustrated in FIG. 4, control processor 20 has determined that, for the "0" indexed entry comprising a "13" key in new forwarding table 26, an entry with the same key (the "1" indexed entry) exists in forwarding table internal copy 28. Control processor 20 has also determined that the processing and forwarding information "B" is the same in tables 26 and 28 for the entries with the "13" key. Thus, after making this determination, control processor 20 has changed the in-use status of the "1" indexed entry in in-use table 29 from "0" to "1" to indicate that the corresponding entry in active forwarding table 34 is active. Control processor 20 has also changed the synced status of the "0" indexed entry in table 26 from "0" to "1" to indicate that the entry is synchronized.

Figure 5:
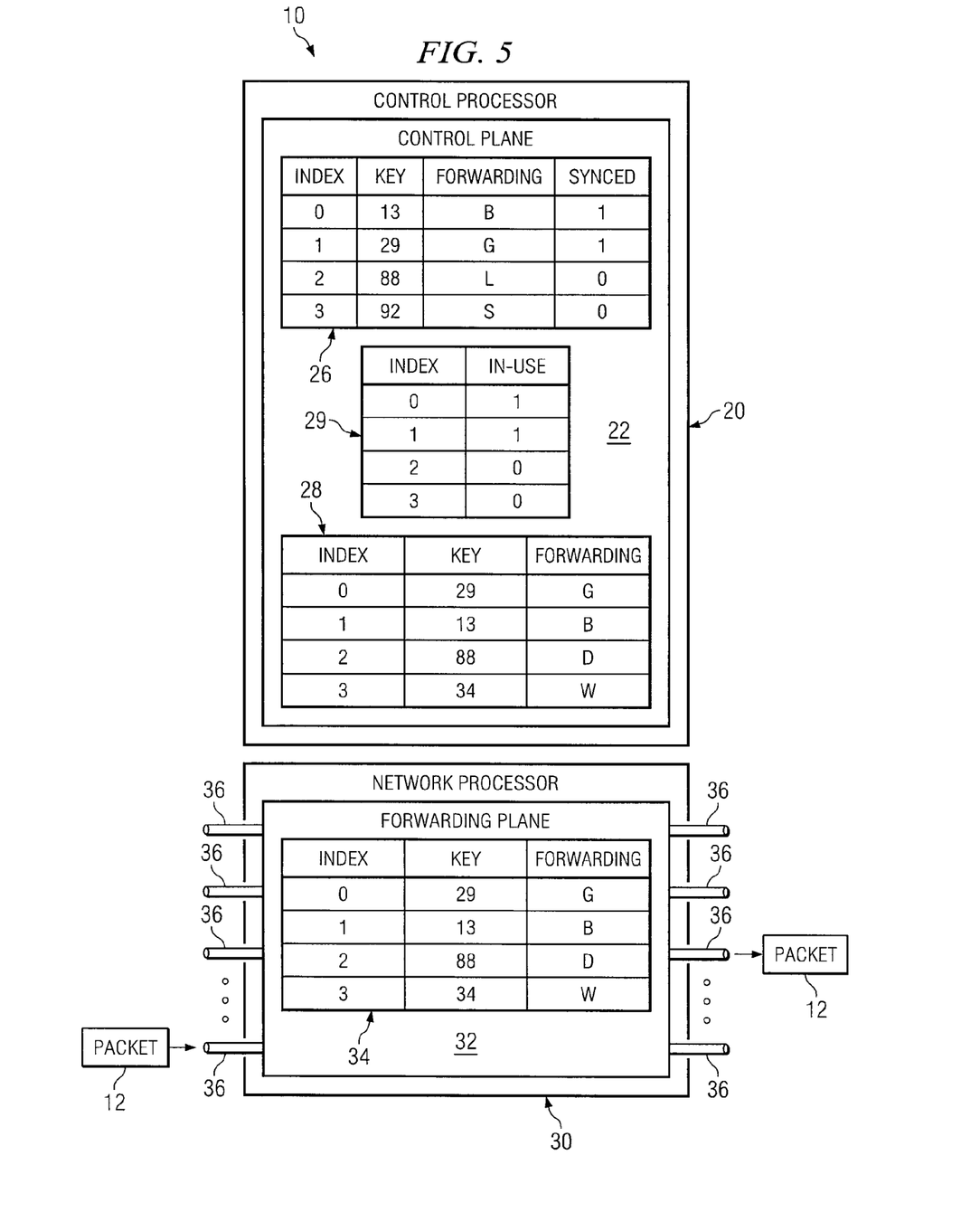

Similarly, as illustrated in FIG. 5, control processor 20 has determined that, for the "1" indexed entry comprising a "29" key in new forwarding table 26, an entry with the same key (the "0" indexed entry) exists in forwarding table internal copy 28. Control processor 20 has also determined that the processing and forwarding information "G" is the same in tables 26 and 28 for the entries with the "29" key. Thus, after making this determination, control processor 20 has changed the in-use status of the "0" indexed entry in in-use table 29 from "0" to "1" to indicate that the corresponding entry in active forwarding table 34 is active. Control processor 20 has also changed the synced status of the "1" indexed entry in table 26 from "0" to "1" to indicate that the entry is synchronized.

Figure 6:
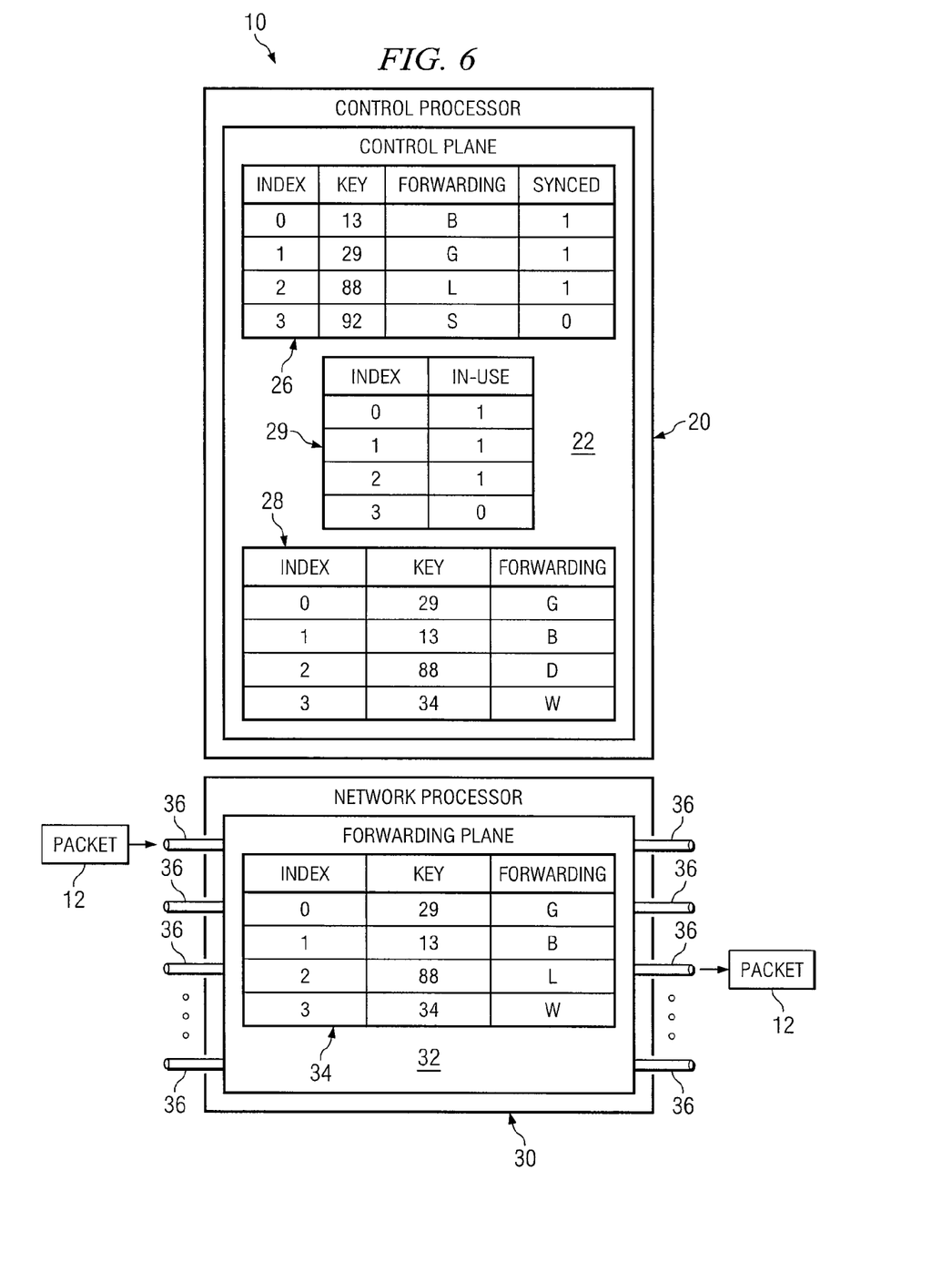

If control processor 20 determines that, for an entry in new forwarding table 26, an entry with the same key exists in forwarding table internal copy 28 but the processing and forwarding information is different in the two tables for that key, control processor 20 is operable to write the new processing and forwarding information in the active forwarding table 34 for that key, using the same index value as that stored in forwarding table internal copy 28 for that key to access that entry in active forwarding table 34, as is discussed below in conjunction with FIG. 6. After writing the new processing and forwarding information in the active forwarding table 34 for that key, control processor 20 is operable to change the in-use status of the entry in in-use table 29 that corresponds to the index value for the particular key in forwarding table internal copy 28. Thus, the in-use status in the corresponding entry in in-use table 29 changes from "0" to "1" to indicate that the corresponding entry in active forwarding table 34 is active. Control processor 20 is also operable to change the synced status of the entry in table 26 for the particular key from "0" to "1" to indicate that the entry is synchronized.

As illustrated in FIG. 6, control processor 20 has determined that, for the "2" indexed entry comprising an "88" key in new forwarding table 26, an entry with the same key (the "2" indexed entry) exists in forwarding table internal copy 28. However, control processor 20 has also determined that the processing and forwarding information "L" in table 26 is different than the processing and forwarding information "D" in table 28 for the entries with the "88" key. Thus, control processor 20 has written the new processing and forwarding information "L" in the active forwarding table 34 for the entry with the "88" key, using the same index value "2" as that stored in forwarding table internal copy 28 for the entry with the "88" key to access the entry with the "88" key in active forwarding table 34. After writing the new processing and forwarding information "L" in active forwarding table 34 for the "2" indexed entry with the "88" key, control processor 20 has changed the in-use status of the "2" indexed entry in in-use table 29 from "0" to "1" to indicate that the corresponding entry in active forwarding table 34 is active. Control processor 20 has also changed the synced status of the "2" indexed entry with the "88" key in table 26 from "0" to "1" to indicate that the entry is synchronized.

After synchronizing entries comprising the same keys in tables 26 and 34, in particular embodiments, control processor 20 is then operable to determine the entries in in-use table 29 that are not in-use and remove the forwarding information in these entries from active forwarding table 34 (or otherwise cause these entries in table 34 to be ignored by network processor 30), as discussed below with reference to FIG. 7. For example, control processor 20 is operable to, for each entry in table 29, identify whether the entry's in-use status is "1." If so, the corresponding entry in forwarding table 34 is in-use. If an entry's in-use status is "0," then the corresponding entry in forwarding table 34 is not in-use, and control processor 20 is operable to remove the forwarding information in that indexed entry in active forwarding table 34 (or otherwise cause the information in that indexed entry to be ignored by network processor 30).

Figure 7:
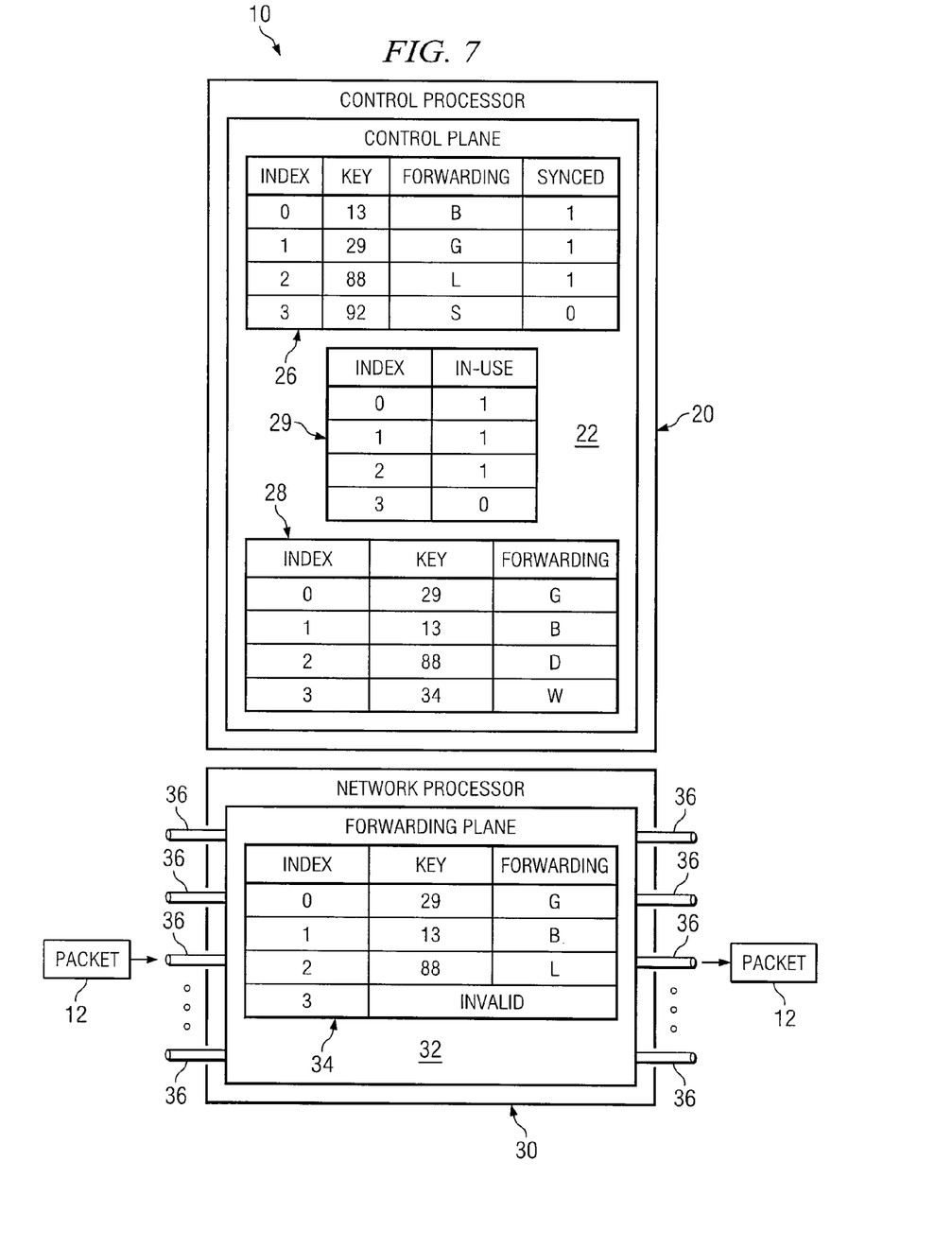

As illustrated in FIG. 7, control processor 20 has determined that, for the "0," "1," and "2" indexed entries in in-use table 29, the in-use status is "1." Control processor 20 has also determined that, for the "3" indexed entry in in-use table 29, the in-use status is "0." Thus, control processor 20 has removed the forwarding information in the "3" indexed entry in active forwarding table 34 (or otherwise caused the information in that indexed entry to be ignored by network processor 30). Control processor 20 has done so in the illustrated embodiment by writing "invalid" for the "3" indexed entry in the key column and in the processing and forwarding information column in active forwarding table 34.

After removing the forwarding information in the entries not in use in active forwarding table 34 (e.g., by writing "invalid" for those entries), in particular embodiments, control processor 20 is then operable to, for each entry in new forwarding table 26, determine whether the entry's synced status is "1." If so, the entry has been synchronized. If an entry's synced status is "0," then the entry has not been synchronized, and control processor 20 is operable to add the information in that entry to an available entry in active forwarding table 34, as discussed below with reference to FIG. 8. To add the information to an available entry in table 34, control processor 20 is operable to search for and identify an entry in in-use table 29 that is not in use. It should be noted that, in particular embodiments, the search for entries in in-use table 29 that are not in use may be performed once to remove entries (discussed above) and to add entries. In alternative embodiments, control processor 20 may perform separate searches to remove entries and to add entries. After identifying an entry in in-use table 29 that is not in use, control processor 20 is operable to write the information from the unsynchronized entry in new forwarding table 26 to the entry in active forwarding table 34 that has the same index as the entry in in-use table 29 that is not in-use. After doing so, control processor 20 is operable to change the in-use status for that entry to "1" in table 29. Control processor 20 is also operable to change the synced status for the now-synchronized entry in table 26 to "1."

Figure 8:
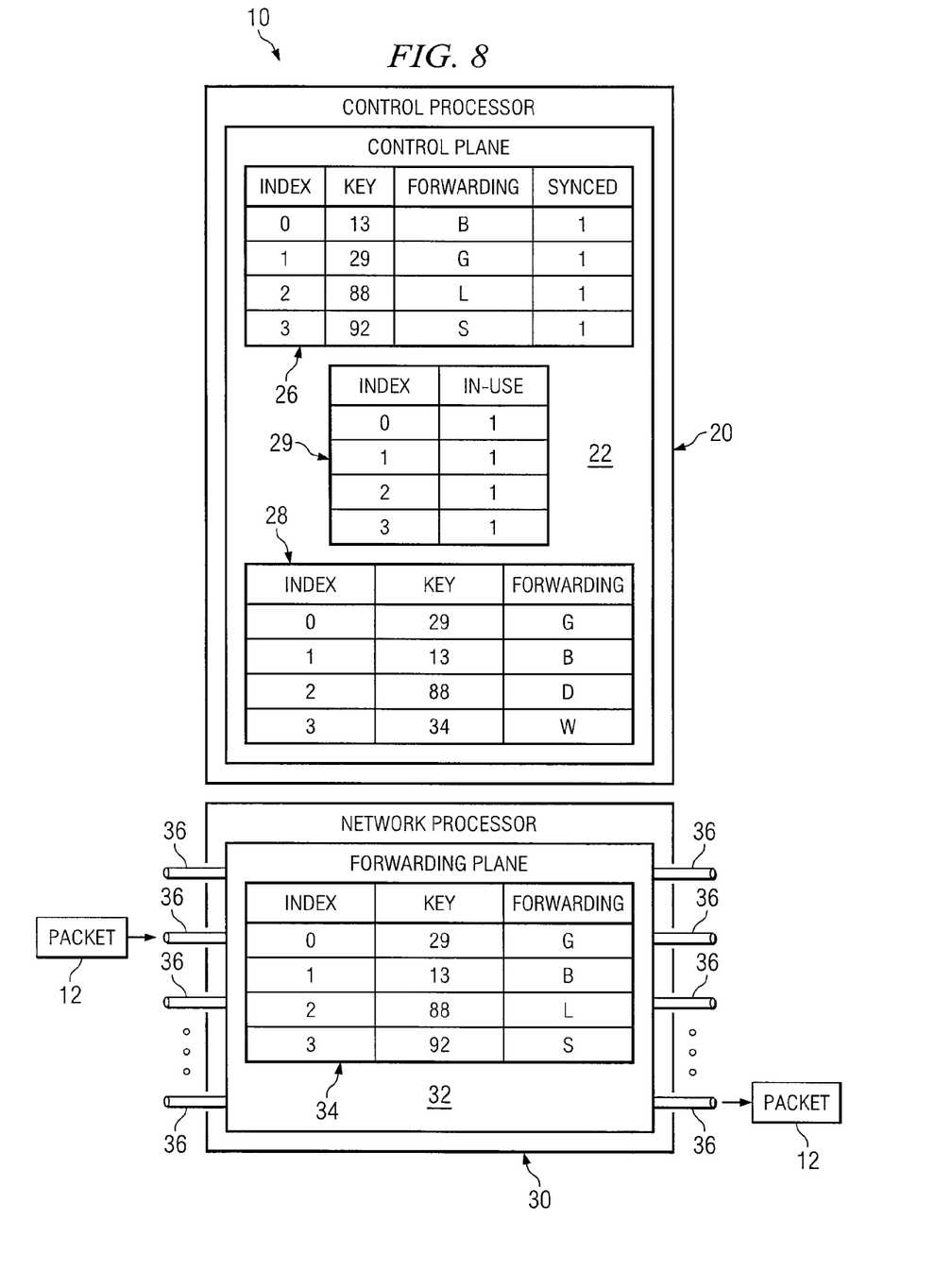
FIG. 8 is a diagram illustrating the example packet forwarding system of FIG. 7 after synchronization of the new forwarding table and the active forwarding table according to a particular embodiment of the invention.

As illustrated in FIG. 7, control processor 20 has determined that, for the "0," "1," and "2" indexed entries in new forwarding table 26, the synced status is "1." Control processor 20 has also determined that, for the "3" indexed entry in new forwarding table 26, the synced status is "0." Thus, as illustrated in FIG. 7, control processor 20 has searched for an indexed entry in in-use table 29 that is not in use and has identified indexed entry "3" as such an entry. As illustrated in FIG. 8, control processor 20 has then written the information from unsynchronized, indexed entry "3" in new forwarding table 26 to indexed entry "3" in active forwarding table 34 (because that entry in active forwarding table 34 has the same index as unused, indexed entry "3" in in-use table 29). After doing so, control processor 20 has changed the in-use status for indexed entry "3" in table 29 from "0" to "1." Control processor 20 has also changed the synced status for the now-synchronized entry "3" in table 26 from "0" to "1."

In this incremental manner, control processor is operable to synchronize the entries in new forwarding table 26 and active forwarding table 34 without requiring that network processor 30 be restarted, use a relatively large amount of memory, or switch from a previous active table to a new regenerated table. During this process, network processor 30 is operable to continue to process and forward packets 12 based on information in active forwarding table 34, as discussed above in conjunction with FIGS. 1 and 2.

It should be noted that, in alternative embodiments, the processes performed in FIGS. 4-8 may be performed in any other suitable order and not necessarily in the order described. It should also be noted that alternative embodiments may comprise multiple active forwarding tables. In those embodiments, the control processor(s) is operable to synchronize the entries in multiple new forwarding tables and the entries in the multiple active forwarding tables in a similar manner as discussed above. It should also be noted that the illustrated embodiments are not limited to any particular table structures or access methods and any suitable table structure and access method may be used, such as, for example, flat tables or content addressable memories (CAMs).

Modifications, additions, or omissions may be made to the example systems and methods described without departing from the scope of the invention. The components of the example methods and systems described may be integrated or separated according to particular needs. Also, the processes may be performed in any suitable order and not necessarily in the order described. Moreover, the operations of the example methods and systems described may be performed by more, fewer, or other components.

Figure 9:
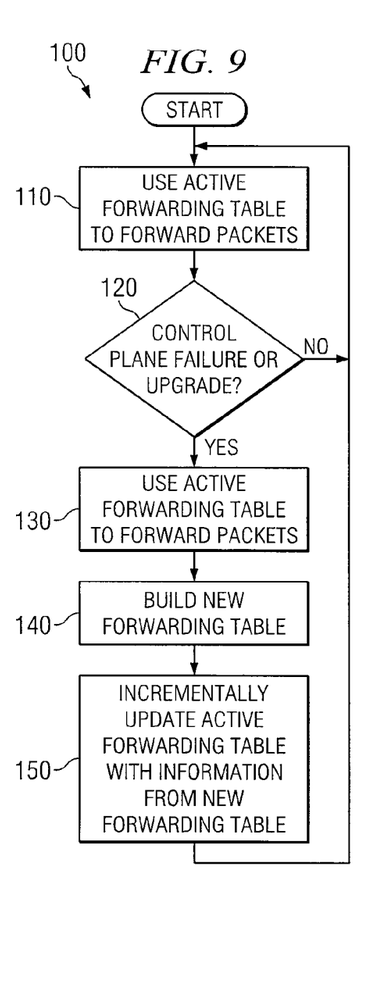
FIG. 9 is a flowchart illustrating an example method for synchronizing packet forwarding information according to a particular embodiment of the invention.

FIG. 9 is a flowchart illustrating an example method 100 for synchronizing packet forwarding information according to a particular embodiment of the invention. At step 110 of method 100, information in an active forwarding table is used to process and forward packets received from one or more network devices to one or more network devices. In particular embodiments, a forwarding plane in a network processor of a packet forwarding system may perform step 110. The information in active forwarding table may be written to active forwarding table in any suitable manner, such as, for example, by a control plane implemented by a control processor of the packet forwarding system. The control plane may generate this table information in any suitable manner, such as for example, based on one or more updates to the status in network configuration and/or protocol information and/or any other suitable information.

At step 120 of method 100, a determination is made whether a control plane failure or upgrade has occurred. If not, method 100 returns to step 110. If a control plane failure or upgrade has occurred, method 100 continues to step 130, and information in the active forwarding table continues to be used to process and forward received packets, as described above. In addition, at step 140 of method 100, a new forwarding table is built by the restarted (old or upgraded) control plane. At step 150 of method 100, the active forwarding table may be incrementally updated with the information in the new forwarding table. While the active forwarding table is incrementally updated, the forwarding plane may continue to process and forward received packets based on the information in the incrementally updated active forwarding table. One example of this incremental update process was described above with respect to FIGS. 4-8 and is also described in the flowchart of FIG. 10 below. After the incremental update process is completed, method 100 returns to step 110.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Figure 10:
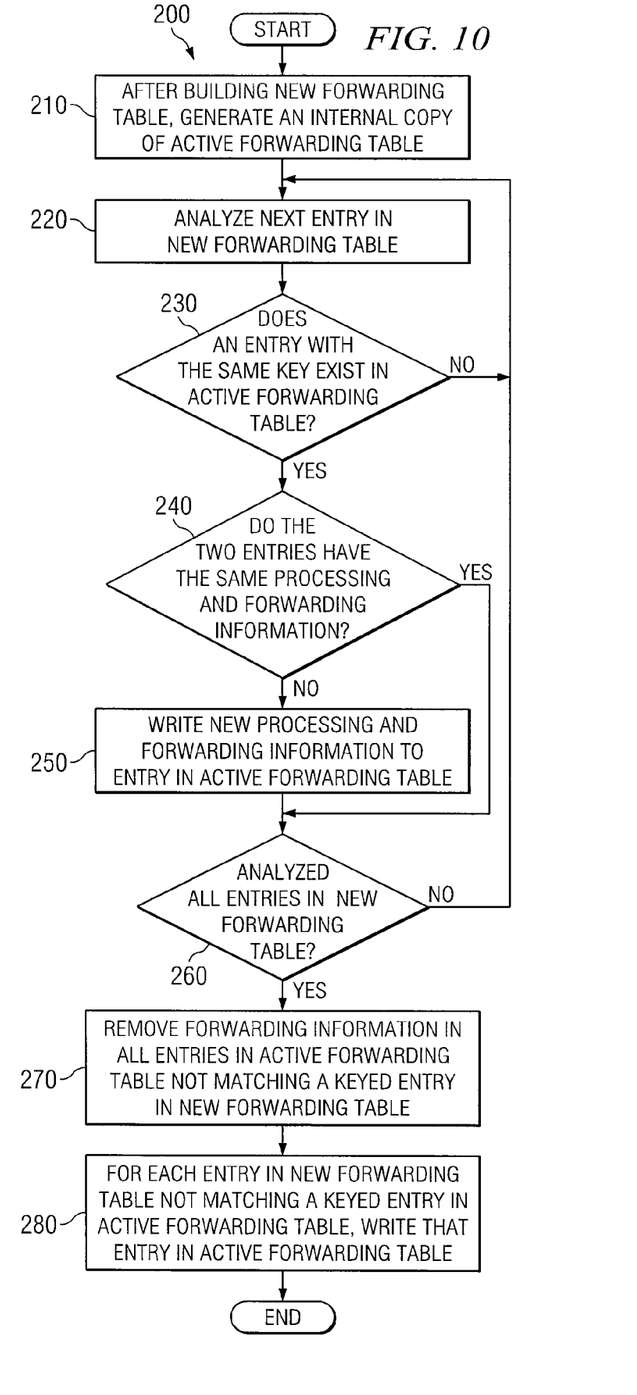
FIG. 10 is a flowchart illustrating an example method for incrementally updating an active forwarding table maintained by a forwarding plane with information in a new forwarding table maintained by a restarted control plane according to a particular embodiment of the invention.

FIG. 10 is a flowchart illustrating an example method 200 for incrementally updating an active forwarding table 34 maintained by a forwarding plane 32 with information in a new forwarding table 26 maintained by a restarted control plane 22 according to a particular embodiment of the invention. It should be noted that although reference is made to the components described above in conjunction with FIGS. 3-8, any other suitable components may be used. Also, the processes discussed below may be performed in any suitable order, not necessarily in the order described.

Method 200 begins at step 210 where, after control plane 22 is restarted and regenerates forwarding table information in a forwarding table 26, control plane 22 sets all entries in the synced column in forwarding table 26 to "0." Control processor 20 also reads the forwarding information in forwarding table 34 in network processor 30 and generates (and stores) an internal copy of this information in table 28 accessible by control plane 22. In addition, control processor 20 also generates an index table 29 to store the in-use state of each entry in forwarding table 34, initially setting all entries in table 29 to "0."

At step 220, to synchronize the information in new forwarding table 26 and the information in forwarding table 34, control processor 20 analyzes the next entry in new forwarding table 26. At step 230, control processor 20 then determines by using a key search whether, for that entry in new forwarding table 26, an entry with the same key exists in forwarding table internal copy 28. If an entry with the same key does not exist in forwarding table internal copy 28, method 200 returns to step 220 and the next entry is analyzed.

If control processor 20 determines that an entry with the same key exists in forwarding table internal copy 28, control processor 20 determines, at step 240 of method 200, whether the processing and forwarding information is the same in tables 26 and 28 for that keyed entry. If the processing and forwarding information is the same in the two tables for that keyed entry, control processor 20 changes the in-use status of the entry in in-use table 29 that corresponds to the index value for the particular key in forwarding table internal copy 28. Thus, the in-use status in the corresponding entry in in-use table 29 changes from "0" to "1" to indicate that the corresponding entry in active forwarding table 34 is active. Control processor 20 also changes the synced status of the entry in table 26 for the particular key from "0" to "1" to indicate that the entry is synchronized. Method 200 then proceeds to step 260, discussed below.

If control processor 20 determines that, for an entry in new forwarding table 26, an entry with the same key exists in forwarding table internal copy 28 but the processing and forwarding information is different in the two tables for that key, at step 250 of method 200, control processor 20 writes the new processing and forwarding information in the active forwarding table 34 for that key, using the same index value as that stored in forwarding table internal copy 28 for that key to access that entry in active forwarding table 34. After writing the new processing and forwarding information in the active forwarding table 34 for that key, control processor 20 changes the in-use status of the entry in in-use table 29 that corresponds to the index value for the particular key in forwarding table internal copy 28. Thus, the in-use status in the corresponding entry in in-use table 29 changes from "0" to "1" to indicate that the corresponding entry in active forwarding table 34 is active. Control processor 20 also changes the synced status of the entry in table 26 for the particular key from "0" to "1" to indicate that the entry is synchronized. Method 200 then proceeds to step 260, where a determination is made whether all entries in new forwarding table 26 have been analyzed. If so, method 200 proceeds to step 270, discussed below. If all entries in new forwarding table 26 have not been analyzed, method 200 returns to step 220, and the next entry in new forwarding table is analyzed.

After synchronizing entries comprising the same keys in tables 26 and 34, in particular embodiments, control processor 20 then determines, at step 270, the entries in in-use table 29 that are not in-use and removes the forwarding information in these entries from active forwarding table 34 (or otherwise causes these entries in table 34 to be ignored by network processor 30). For example, for each entry in table 29, control processor 20 may identify whether the entry's in-use status is "1." If so, the corresponding entry in forwarding table 34 is in-use. If an entry's in-use status is "0," then the corresponding entry in forwarding table 34 is not in-use, and control processor 20 removes the forwarding information in that indexed entry in active forwarding table 34 (or otherwise causes the information in that indexed entry to be ignored by network processor 30).

After removing the forwarding information in the entries not in use in active forwarding table 34, in particular embodiments, control processor 20 then determines, at step 280, for each entry in new forwarding table 26, whether the entry's synced status is "1." If so, the entry has been synchronized. If an entry's synced status is "0," then the entry has not been synchronized, and control processor 20 searches for and identifies an entry in in-use table 29 that is not in use. After identifying an entry in in-use table 29 that is not in use, control processor 20 writes the information from the unsynchronized entry in new forwarding table 26 to the entry in active forwarding table 34 that has the same index as the entry in in-use table 29 that is not in-use. After doing so, control processor 20 changes the in-use status for that entry to "1" in table 29. Control processor 20 also changes the synced status for the now-synchronized entry in table 26 to "1."

In this incremental manner, control processor 20 synchronizes the entries in new forwarding table 26 and active forwarding table 34 without requiring that network processor 30 be restarted, use a relatively large amount of memory, or switch from a previous active table to a new regenerated table. During this process, network processor 30 continues to process and forward packets 12 based on information in active forwarding table 34, as discussed above in conjunction with FIGS. 1, 2, and 9.

Modifications, additions, or omissions may be made to the example systems and methods described without departing from the scope of the invention. The components of the example methods and systems described may be integrated or separated according to particular needs. Also, the processes may be performed in any suitable order and not necessarily in the order described. Moreover, the operations of the example methods and systems described may be performed by more, fewer, or other components.

Although the present invention has been described with several embodiments, various changes and modifications may be suggested to one skilled in the art. It is intended that the present invention encompass such changes and modifications as fall within the scope of the appended claims.

What is claimed is:

1. A system for synchronizing packet forwarding information, comprising:
    a control processor configured to implement a control plane to generate first forwarding information and transfer the first forwarding information to an active forwarding table of a network processor; and
    a network processor configured to implement a forwarding plane to receive packets and use the first forwarding information in the active forwarding table to forward the received packets to one or more network devices;
    wherein, after the control plane is restarted, the control processor is further configured to use the restarted control plane to generate second forwarding information and incrementally update the first forwarding information in the active forwarding table with the second forwarding information while the network processor's forwarding plane continues to forward traffic, wherein incrementally updating the first forwarding information comprises reading the first forwarding information in the active forwarding table to create an internal copy of the first forwarding information in the control plane and comparing the second forwarding information to the internal copy of the first forwarding information to determine how to incrementally update the first forwarding information in the active forwarding table with the second forwarding information.

2. The system of claim 1, wherein the restarted control plane incrementally updates the first forwarding information in the active forwarding table with the second forwarding information by incrementally adding to the active forwarding table forwarding information comprised in the second forwarding information that is not already comprised in the active forwarding table.

3. The system of claim 1, wherein the restarted control plane incrementally updates the first forwarding information in the active forwarding table with the second forwarding information by incrementally removing from the active forwarding table forwarding information that is not comprised in the second forwarding information.

4. The system of claim 1, wherein the network processor's forwarding plane continues to forward traffic based on the incrementally updated forwarding information in the active forwarding table.

5. A method for synchronizing packet forwarding information, comprising:
   using a control plane, generating first forwarding information and transferring the first forwarding information to an active forwarding table;
   using a forwarding plane, receiving packets and using the first forwarding information in the active forwarding table to forward the received packets to one or more network devices; and
   after the control plane is restarted, generating second forwarding information and incrementally updating the first forwarding information in the active forwarding table with the second forwarding information using the restarted control plane while continuing to forward traffic using the forwarding plane, wherein incrementally updating the first forwarding information comprises reading the first forwarding information in the active forwarding table to create an internal copy of the first forwarding information in the control plane and comparing the second forwarding information to the internal copy of the first forwarding information to determine how to incrementally update the first forwarding information in the active forwarding table with the second forwarding information.

6. The method of claim 5, wherein the restarted control plane incrementally updates the first forwarding information in the active forwarding table with the second forwarding information by incrementally adding to the active forwarding table forwarding information comprised in the second forwarding information that is not already comprised in the active forwarding table.

7. The method of claim 5, wherein the restarted control plane incrementally updates the first forwarding information in the active forwarding table with the second forwarding information by incrementally removing from the active forwarding table forwarding information that is not comprised in the second forwarding information.

8. The method of claim 5, wherein traffic continues to be forwarded using the forwarding plane based on the incrementally updated forwarding information in the active forwarding table.

9. A non-transitory computer-readable medium comprising software that, when executed by a processor:
   generates first forwarding information on a control plane and transfer transfers the first forwarding information to an active forwarding table of a forwarding plane;
   receives packets on the forwarding plane and uses the first forwarding information in the active forwarding table to forward the received packets to one or more network devices; and
   after the control plane is restarted, generates second forwarding information and incrementally updates the first forwarding information in the active forwarding table with the second forwarding information while the forwarding logic continues to forward traffic, wherein incrementally updating the first forwarding information comprises reading the first forwarding information in the active forwarding table to create an internal copy of the first forwarding information in the control plane and comparing the second forwarding information to the internal copy of the first forwarding information to determine how to incrementally update the first forwarding information in the active forwarding table with the second forwarding information.

10. The non-transitory computer-readable medium of claim 9, wherein the restarted control logic incrementally updates the first forwarding information in the active forwarding table with the second forwarding information by incrementally adding to the active forwarding table forwarding information comprised in the second forwarding information that is not already comprised in the active forwarding table.

11. The non-transitory computer-readable medium of claim 9, wherein the restarted control logic incrementally updates the first forwarding information in the active forwarding table with the second forwarding information by incrementally removing from the active forwarding table forwarding information that is not comprised in the second forwarding information.

12. The non-transitory computer-readable medium of claim 9, wherein the forwarding logic continues to forward traffic based on the incrementally updated forwarding information in the active forwarding table.

\* \* \* \* \*